United States Patent
Lee et al.

(10) Patent No.: US 7,301,757 B2
(45) Date of Patent: Nov. 27, 2007

(54) CASE FOR CARRYING AND MOUNTING AN IMAGE SYSTEM IN A CAR

(75) Inventors: Jung Hoon Lee, Seoul (KR); Jung Ho Park, Seoul (KR); Hyun Ki Cho, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 436 days.

(21) Appl. No.: 10/988,513

(22) Filed: Nov. 16, 2004

(65) Prior Publication Data

US 2005/0105254 A1    May 19, 2005

(30) Foreign Application Priority Data

| Nov. 17, 2003 | (KR) | ................... 10-2003-0081145 |
| Nov. 17, 2003 | (KR) | ................... 10-2003-0081149 |
| Nov. 17, 2003 | (KR) | ................... 10-2003-0081151 |
| Nov. 17, 2003 | (KR) | ................... 10-2003-0081215 |
| Nov. 17, 2003 | (KR) | ................... 10-2003-0081218 |

(51) Int. Cl.
*H05K 7/00* (2006.01)

(52) U.S. Cl. .................. 361/681; 361/683; 224/275

(58) Field of Classification Search ................ 361/681, 361/683; 224/275, 276, 929; D3/271.11, D3/273–274
See application file for complete search history.

(56) References Cited

U.S. PATENT DOCUMENTS

| 4,974,765 | A | * | 12/1990 | Marchetto et al. ........... 224/275 |
| 6,092,705 | A | * | 7/2000 | Meritt .......................... 224/275 |
| 6,216,927 | B1 | * | 4/2001 | Meritt .......................... 224/275 |
| 6,619,605 | B2 | * | 9/2003 | Lambert ................. 248/226.11 |
| 6,899,365 | B2 | * | 5/2005 | Lavelle et al. ........... 296/37.15 |
| 6,928,654 | B2 | * | 8/2005 | Tranchina et al. ............. 725/75 |
| D518,293 | S | * | 4/2006 | Lam ............................. D3/273 |
| 7,048,163 | B2 | * | 5/2006 | Albert et al. ................ 224/275 |
| 2003/0038149 | A1 | | 2/2003 | Purpura |
| 2005/0098594 | A1 | * | 5/2005 | Truong ........................ 224/275 |
| 2005/0146844 | A1 | * | 7/2005 | Hussaini et al. ............. 361/681 |
| 2006/0208020 | A1 | * | 9/2006 | Albert et al. ................ 224/275 |

FOREIGN PATENT DOCUMENTS

| DE | 39041107 | 8/1990 |
| DE | 9105125.8 | 8/1991 |
| KR | 20-0307589 | 3/2003 |

* cited by examiner

*Primary Examiner*—Jayprakash Gandhi
*Assistant Examiner*—Anthony Q Edwards
(74) *Attorney, Agent, or Firm*—Bacon & Thomas, PLLC

(57) ABSTRACT

A case for carrying and mounting an image system is capable of accommodating an image reproducing device and a display device and is able to be secured to a seat of a car, to thereby allow a passenger to watch the display device while controlling the image reproducing device. The case includes a front case for housing the display device, a rear case for housing the image reproducing device, a connecting portion formed around one edge portions of the front and the rear cases to allow anyone of the front and the rear cases to be opened with respect to the other one by being rotated about the connecting portion, a take-out member for taking out the image reproducing device mounted inside the rear case to expose a manipulation panel of the image reproducing device; and a mounting strap for securing the front case and the rear case around the seat of the car.

13 Claims, 18 Drawing Sheets

CASE FOR CARRYING AND MOUNTING AN IMAGE SYSTEM IN A CAR

FIELD OF THE INVENTION

The present invention relates to a case for carrying and mounting an image system in a car; and, more particularly, to a case capable of accommodating an image reproducing device and a display device therein while allowing them to be carried safely and capable of being attached to or detached from a backside of a seat in a car.

BACKGROUND OF THE INVENTION

With a recent trend for installing a display device, i.e., a monitor, in a car to allow a passenger to watch TV or video and enjoy a game in the car, various AV systems equipped with display devices are mounted in the car.

Such AV systems are implemented by appropriately combining a liquid crystal display of a touch screen type, a video system, an audio system, a CD changer, a navigation system, a DVD player, a satellite broadcasting set-top box, and the like, and are endowed with diversified and improved functions to support Internet, wireless telecommunications, voice recognition and character-voice conversion, etc., in addition to a function to do navigation.

However, most of the AV systems for a car are installed in the car by an 'on-dash' type or an 'in-dash' type mounting scheme. With regard to the on-dash type scheme, an AV system is secured/coupled on a dashboard of a car. In the in-dash type scheme, on the other hand, the AV system is installed inside the dashboard and a monitor is projected upward when a power button is pressed.

However, since such mounting methods for the car AV system is more complicated than those for the installation of general household AV systems, general users other than experts have many difficulties in installing the car AV systems, and have to get it done by, for example, an AV system service agent. Furthermore, such mounting methods are disadvantages in that they cannot satisfy the increasing demand to install a large-size liquid crystal display not smaller than 7-inch in the car.

Accordingly, systems for carrying and detachably mounting the AV systems in the car have been utilized, and one example of such systems is disclosed in U.S. Pat. No. 6,092,705, entitled "SELF-CONTAINED CASE FOR HOUSING TRANSPORTING AND MOUNTING VIDEO MONITOR AND VIDEO PLAYER FOR USE IN PASSENGER VEHICLES", which is filed on Jan. 25, 1999.

FIG. 15 is a perspective view of a mounting system that is secured inside the car, disclosed in U.S. Pat. No. 6,092,705. The mounting system allows entertainment video accessories to be detachably and securely mounted inside the car. The mounting system includes a rectangular case 10 elongated in a vertical direction, for housing video accessories; and quick connect members 20 for detachably securing the case 10 to a seat of the car.

A front panel 16 and a mesh side panel 12 connected to each other by a zipper are attached to the case 10 to open or close an upper and a lower portion of the case 10, respectively. The mesh side panel 12 can be moved outwardly at a predetermined angle in order to allow the passenger to access the video accessories easily. An image reproducing device 3 is mounted inside the mesh side panel 12 and a display device 4 is mounted to an upper inner portion of the case 10 via a mounting unit 14 to receive signals from the image reproducing device 3. By folding back the front panel 16, the upper portion of the case 10 is opened and the display device 4 is exposed.

The quick connect members 20 are detachably connected and fastened at positions close to all of the internal floor, a first headrest 1 and a second headrest 2 of the car.

However, carrying the case 10 is not convenient because of its long length and there is likelihood that the accessories accommodated in the case 10 are damaged while it is being carried. Moreover, it is rather troublesome and time-consuming to open the front panel 16 that covers the upper and the lower portion of the case 10.

SUMMARY OF THE INVENTION

It is, therefore, an object of the present invention to provide a portable case for carrying and mounting an image system that is capable of opening easily and is capable of protecting the image system and parts accommodated therein stably.

In accordance with the present invention, there is provided a case for carrying and mounting an image system capable of accommodating an image reproducing device and a display device therein and of being secured to a seat of a car, comprising: a first case for housing the display device; a second case for housing the image reproducing device; a connecting portion formed around one edge portions of the first and the second cases to allow anyone of the first and the second cases to be opened with respect to the other one by being rotated about the connecting portion; a take-out member for taking out the image reproducing device mounted inside the second case to expose a manipulation panel of the image reproducing device; and mounting means for securing the first case and the second case around the seat of the car.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
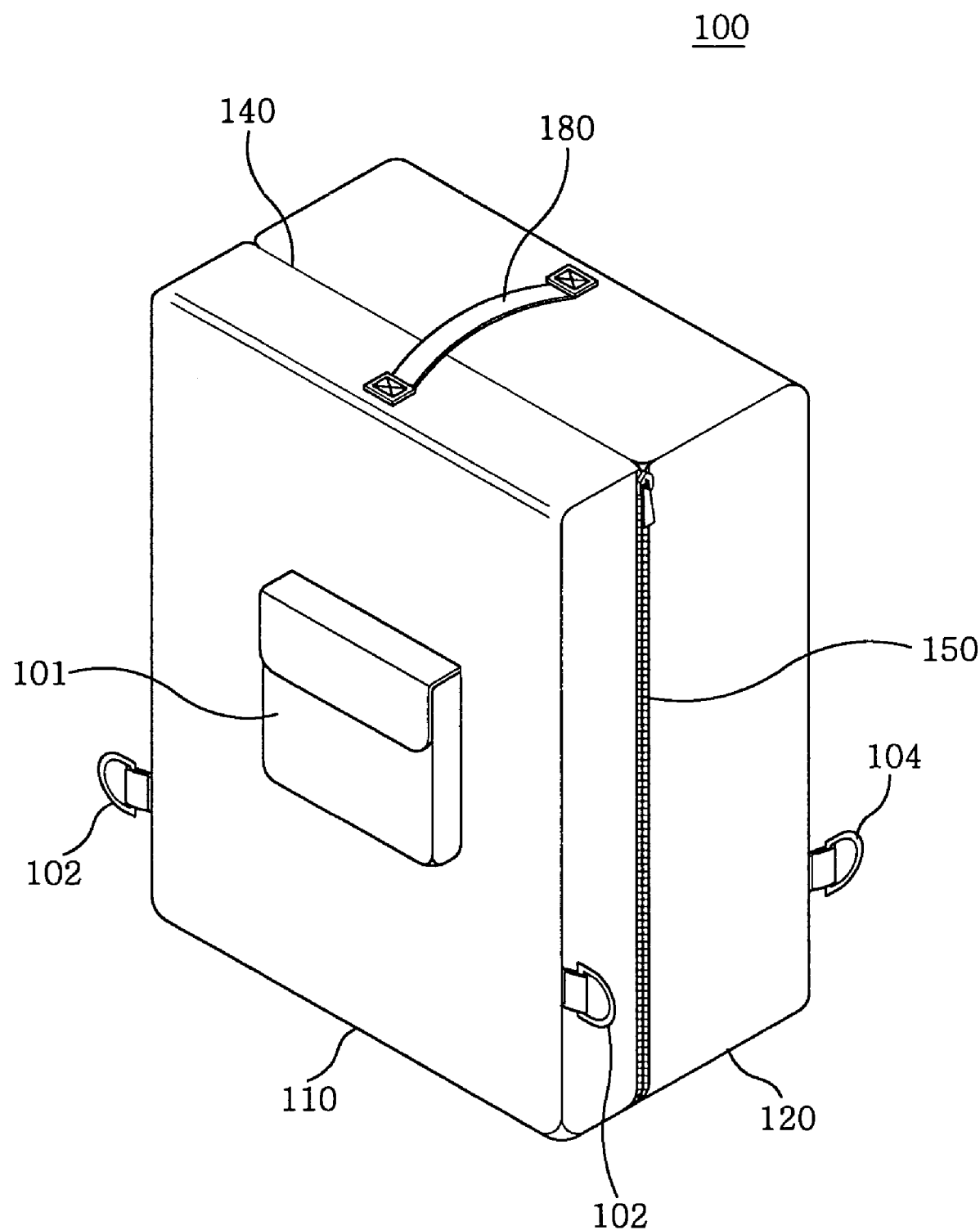
FIG. 1 is a perspective view of a case for carrying and mounting an image system in accordance with a first preferred embodiment of the present invention.

Preferred embodiments of the present invention will now be described with reference to the accompanying drawings, wherein like reference numerals represent like or corresponding parts in various drawings.

FIGS. 1 to 4 show a case 100 for carrying and mounting an image system in accordance with a first preferred embodiment of the present invention. As shown in FIGS. 1 to 4, the case 100 includes a front case 110 for housing a display device 4, a rear case 120 for housing an image reproducing device 3, a take-out member 130 for taking the image reproducing device 3 from the rear case 120, a connecting portion 140 for connecting the front case 110 and the rear case 120, a combining member 150 for selectively combining the front case 110 with the rear case 120, and a mounting strap 160 for mounting the case 10 to the backside of the seat of a car.

The front case 100 is of rectangular box shape with an opened front side, and the display device 4 is installed in an inner space of the front case 100 through the opened front side.

Figure 2:
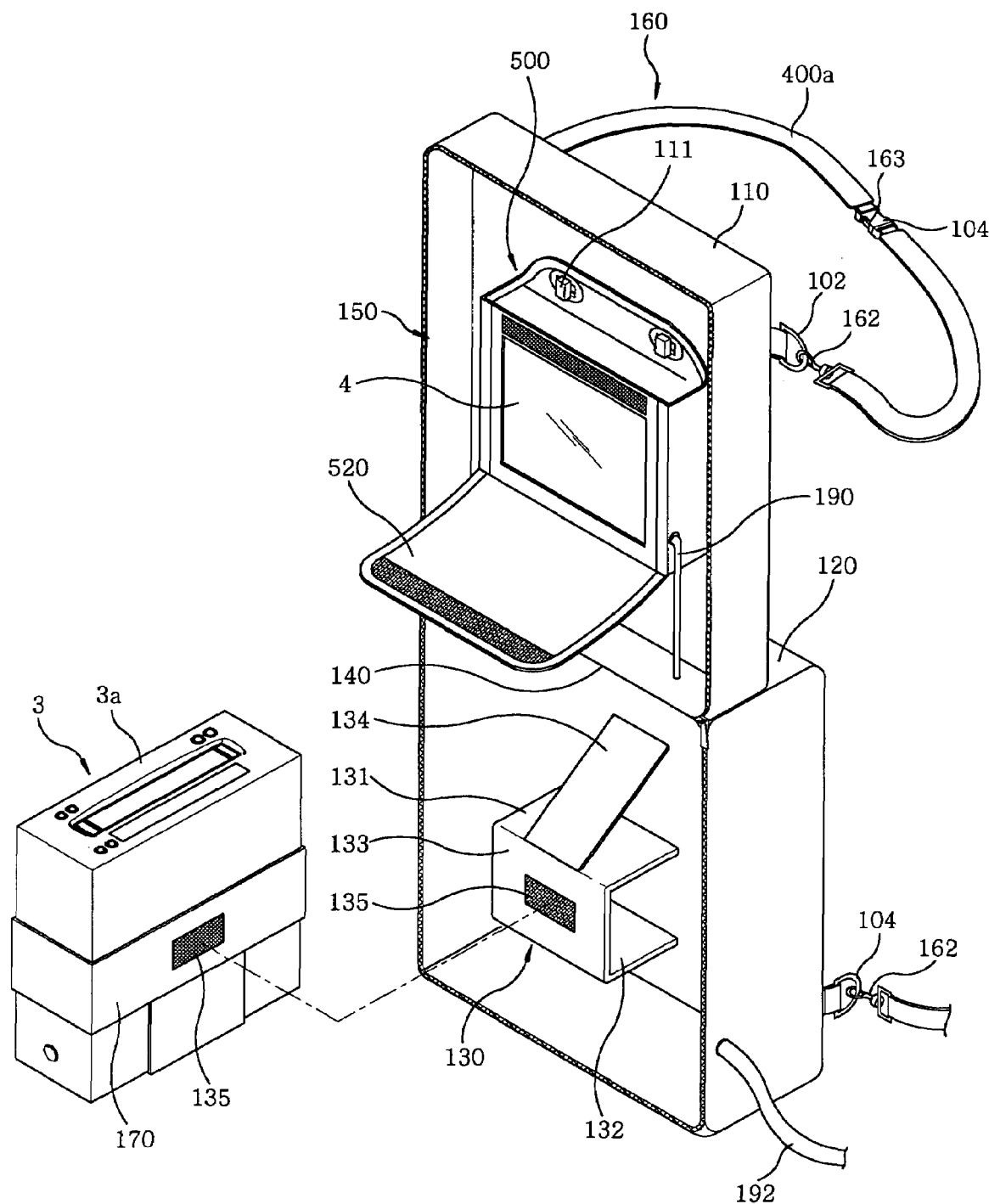
FIG. 2 presents a perspective view of the case shown in FIG. 1 in an open mode.

The display device 4 is detachably secured to the inner surface of the front case 110 by means of a mounting unit 500. As shown in FIG. 2, the mounting unit 500 having the display device 4 therein is secured to the front case 110 by fitting engagement buttons 111 installed on the inner surface of the front case 110 into corresponding engagement holes formed at an upper portion of the mounting unit 500. Further, the mounting unit 500 has a front cover 520 which is configured to be opened or closed by using a fastening member 540. Alternatively, the mounting unit 500 can be directly and detachably mounted to a headrest of the car without having to use the case 100, as will be described later with reference to FIGS. 11A to 14B.

Meanwhile, the display device 4 may be preferably an LCD (Liquid Crystal Display) television set or a LCD monitor capable of receiving and displaying signals from the image reproducing device 3. Alternatively, it is also possible to use a cathode ray tube or plasma television set or a cathode ray tube or plasma monitor as the display device 4.

In addition to receiving the signals from the image reproducing device 3, the display device 4 may receive a radio frequency signal from an antenna (not shown). It is preferable that the display device 4 includes a radio frequency transceiver unit of built-in type in order to allow a user to hear sounds of the display device 4 from a FM radio prepared in the car. Furthermore, instead of having the built-in type radio frequency transceiver unit, the display device 4 can use an external FM transceiver connected thereto via an earphone jack.

Further, a pocket 101 is provided on an external surface of the front case 110, and connection loops 102 are installed at two opposite corner portions of the external surface of the front case 110. As exemplified in the drawings, the front case 110 is secured to a headrest 2 of the car by means of the mounting strap 160.

The rear case 120 is of a rectangular box shape with an opened front side as similar as the front case 110. The rear case 120 is disposed to be face-to-face opposite with the front case 110. The image reproducing device 3 such as a videocassette player and a DVD player is accommodated in a subsidiary case 170, which is removably mounted through the opened front side in the inner space of the rear case 120.

The image reproducing device 3 accommodated in the subsidiary case 170 is preferably of a combination type having both a videocassette player and a DVD player. The image reproducing device 3 is vertically mounted in the subsidiary case 170 such that a manipulation panel 3a is exposed upward, and is forwardly withdrawn from the rear case 120 by the take-out member 130 in order to allow the user to control the manipulation panel 3a.

Figure 3A:
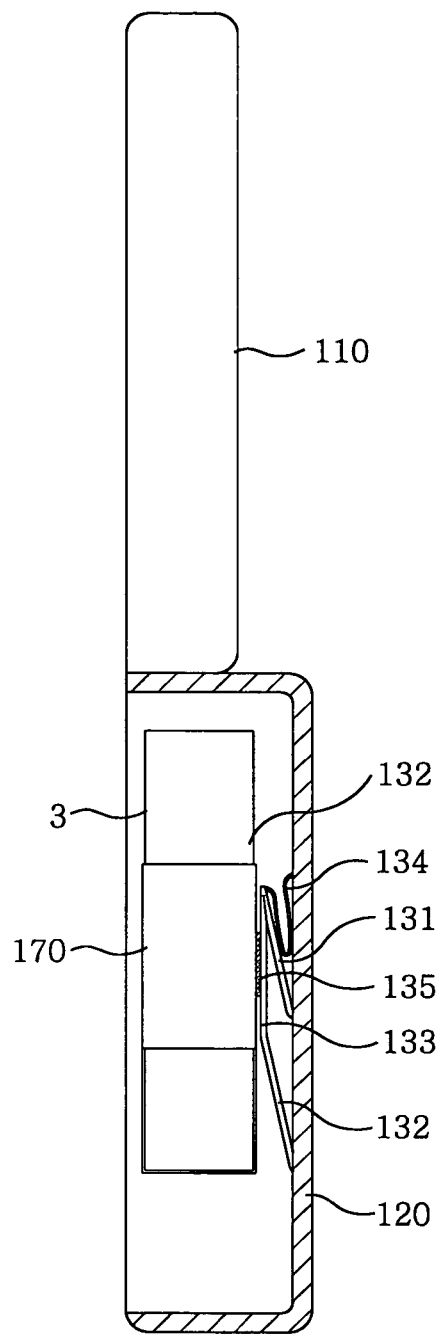
FIGS. 3A and 3B are sectional side elevation views of the case shown in FIG. 1 in an operational mode.
Figure 3B:
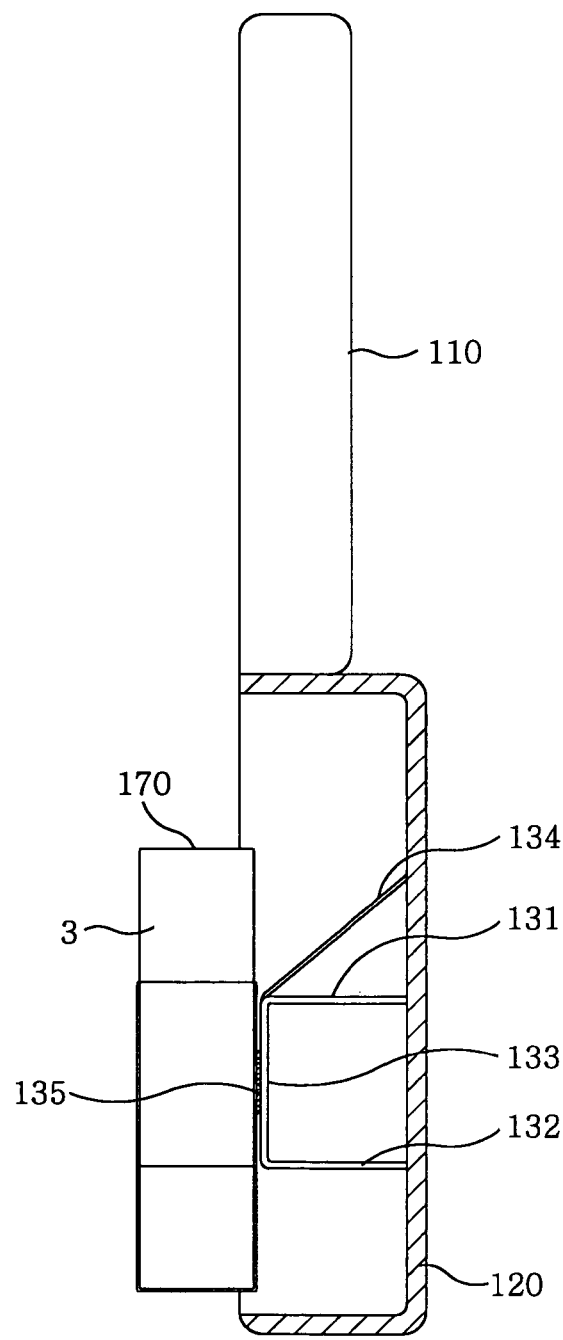

As shown in FIGS. 3A and 3B, the take-out member 130 is installed at the inner surface of the rear case 120 such that it is folded upward or it is unfolded outward when the image reproducing device 3 is located in the rear case 120 or is taken out from the rear case 120, respectively. The take-out member 130 is formed of a first horizontal plate 131 and a second horizontal plate 132, spaced each other, whose one ends of the first and the second horizontal plate 131 and 132 are fixed at the inner surface of the rear case 120, respectively, and a vertical plate 133 for connecting the other ends of the first and the second horizontal plate 131 and 132.

Each of the first and the second horizontal plates 131 and 132 and the vertical plate 133 is formed of a cushion stuffed with a hard plate.

Moreover, connected to the upper end of the vertical plate 133 is a foldable supporting strap 134 for supporting the first and the second horizontal plate 131 and 132 horizontally, thereby allowing the image reproducing device 3 to be taken out in a horizontal direction as shown in FIG. 3B.

Further, fastening members 135 are provided on the external surfaces of the vertical plate 133 and the subsidiary case 170, respectively, to be fastened to each other. The fastening members 135 are preferably fastening tapes.

Moreover, a plurality of connection loops 102 and 104 are provided at corner portions of the rear surfaces of the front case 110 and the rear case 12, so that the front and the rear cases 110 and 120 can be secured in the seat of the car by using the mounting strap 160 connected to the connection loops 102 and 104.

In accordance with the preferred embodiment of the present invention, two mounting straps 160 respectively secured to the rear surfaces of the front case 110 and the rear case 120 are used to be wounded around the headrest 2 and the waist portion of the seat 6, respectively, to thereby allow the front case 110 and the rear case 120 to be fastened to the backside of the seat 6 of the car.

Each of the mounting straps 160 is provided with buckles 163 and 164 detachably engaged with each other, and the mounting straps 160 are detachably connected through the use of a hook 162 to the connection loops 102 and 104 formed at the two opposite sides of the rear surface of the front case 110 and the rear case 120, respectively.

Further, the combining member 150 is installed around edge portions excepting upper edge portions of the front case 110 and the rear case 120 to fasten the front case 110 and the rear case 120 on top of each other. Preferably, the combining member 150 is of a zipper.

Further, the connecting portion 140 for connecting the upper edge portions of the front case 110 and the rear case 120 as one body is provided. The connecting portion 140 allows the front and the rear cases 110 and 120 fastened on top of each other via the combining member 150 to be rotated with respect to either one of them, to be thereby switched to an open mode.

Further, a handle 180 is formed such that it is extended over the upper portions of both the front and the rear cases 110 and 120.

Inside the rear case 120, a cable 190 is provided to transmit signals from the image reproducing device 3 to the display device 4.

Further, a power supply cable 192 connected to the image reproducing device 3 is coupled to a cigarette lighter jack (not shown) of the car to receive electrical power therefrom.

The followings are description for the case for carrying and mounting the image system configured as described above in accordance with the first preferred embodiment of the present invention.

The mounting unit 500 having the display device 4 installed therein is mounted to the inner surface of the front case 110 by rendering the engagement buttons 111 fitted into the engagement holes.

The image reproducing device 3 is secured on the take-out member 130 in the rear case 120 such that the manipulation panel 3a faces upward.

Here, the display device 3 and the image reproducing device 3 are connected to each other via the cable 190 in advance.

The front case 110 and the rear case 120 are folded on top of each other via the combining member 150. Then, by holding the handle 180, the user can carry the case conveniently.

The following are description of how to mount and use the case for carrying and mounting the image system in the car.

First, the zipper of the combining member 150 is opened, and the front case 110 and the rear case 120 separated from each other are rotated about the connecting portion 130 such that they are located on a same plane, making an open mode. The case for carrying and mounting the image system is secured to the inside of the car in such an open mode.

Figure 4:
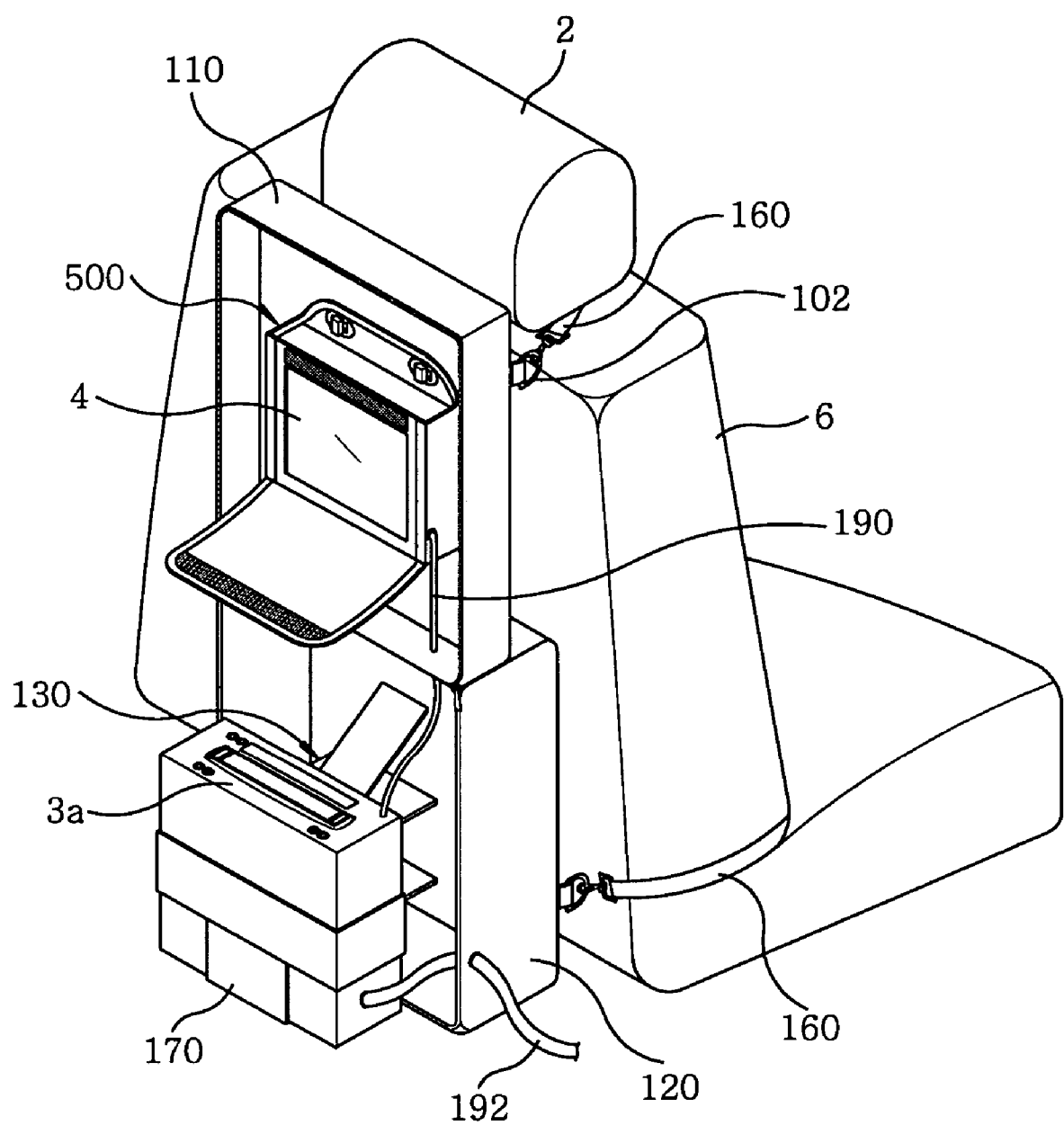
FIG. 4 sets forth a perspective view of the case shown in FIG. 1 in the operational mode, which is secured inside a car.

As shown in FIG. 4, the mounting strap 160 is connected to the connection loop 102 of the front case 120 via a hook 162, and is fastened around the headrest 2 of the car. Further, the mounting strap 160 is connected to the connection loop 102 of the rear case 120 via a hook 162, and is fastened around the seat 6.

The power supply cable 192 coupled to the cigarette lighter jack (not shown) is connected to the image reproducing device 3 through an opening provided at one side of the rear case 120.

Then, by separating the front cover 520 from the mounting unit 500, the display device 4 is exposed such that the user can watch it.

Referring to FIGS. 3A and 3B, there is shown the take-out member 130 used to draw the image reproducing device 3 out of the rear case 120.

When the user pulls forward the image reproducing device 3 which is secured in the rear case 120 via the fastening members 135 provided on the take-out member 130 and the subsidiary case 170, the first and the second horizontal plates 131 and 132 once folded in an upward direction become to be rotated or unfolded forward. Such rotation of the first and the second horizontal plate 131 and 132 is stopped by the supporting strap 133, at which state the first and the second horizontal plate 131 and 132 are maintained horizontal while the vertical plate 133 stands upright. That is to say, the take-out member 130 maintains a one-side-opened square shape.

Accordingly, the image reproducing device 3 is projected forward while its horizontal orientation is maintained. Therefore, it becomes possible to load a video cassette, a CD, or the like into the image reproducing device 3 through the manipulation panel 3a, to thereby allow the user to watch images displayed on the-display device 4.

When the user stops watching and wants to carry or store the case for carrying and mounting the image system, the power supply cable 192 is removed and the image reproducing device 3 is pushed inside the rear case 120.

By this operation, the take-out member 130 is rotated or folded in the upward direction while being loaded into the rear case 120. At this time, the supporting strap 134 is also folded along with the plates 131, 132 and 133. Further, the front cover 520 of the mounting unit 500 is closed.

Furthermore, the mounting straps 160 are disengaged from the connection loops 102 and 104 to be separated from the headrest 2 and the seat 6. The separated mounting straps 160 are stored inside either one of the rear case 120 and the front case 110 or in an external pocket 101.

Thereafter, the front case 110 and the rear case 120 are folded on top of each other with respect to the connecting potion 140 and are fastened by the combining member 150 to be carried by the user.

Since the rear case 120 and the front case 110 are folded, it is easy to carry the case for carrying and mounting the image system, while protecting the image system accommodated therein. Furthermore, since the opening of the case can be carried out simply by releasing the combining member 150 such that the image reproducing device 3 is taken out of the case, it becomes easier to operate the image system.

Figure 5:
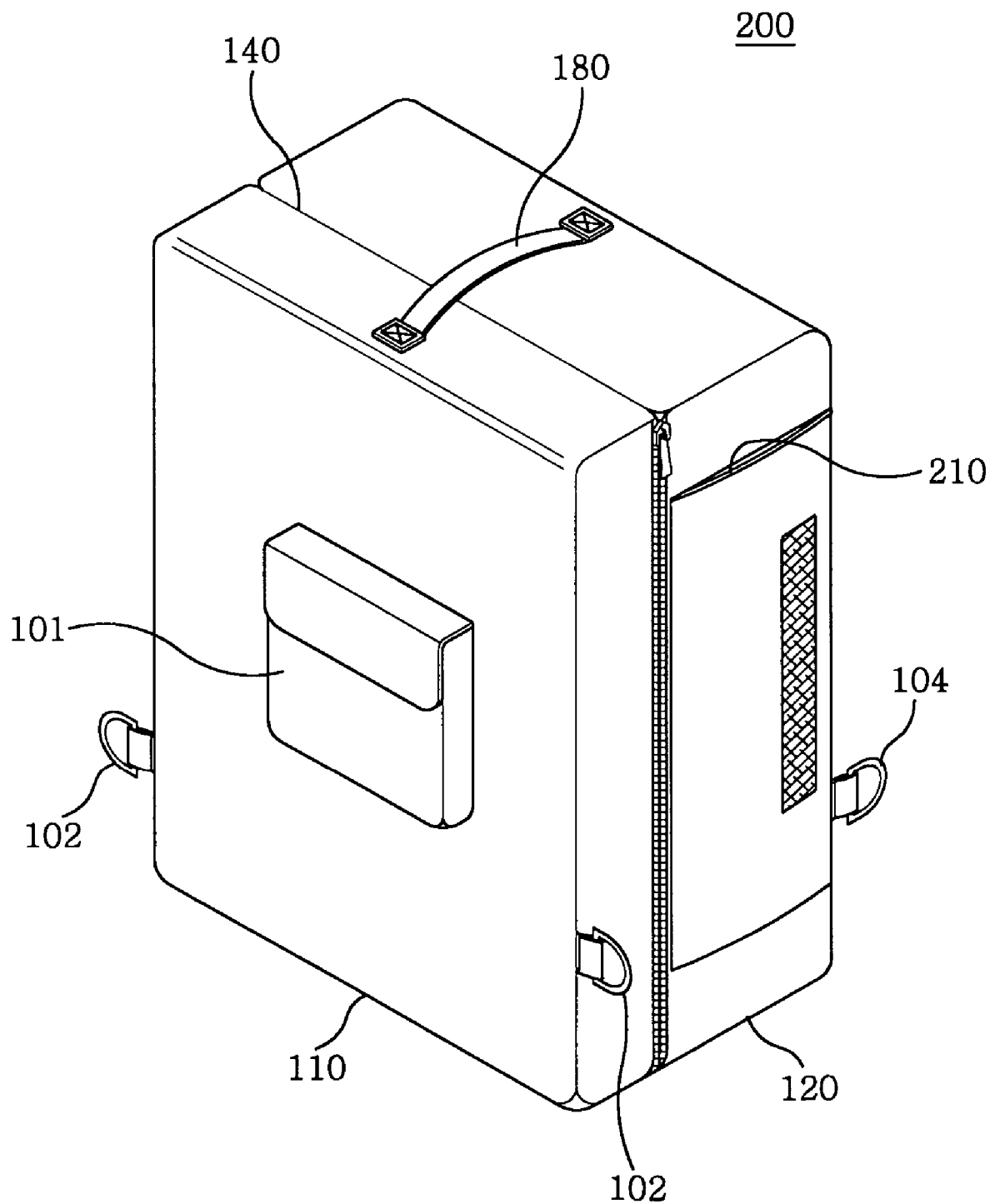
FIG. 5 is a perspective view of a case for carrying and mounting an image system in accordance with a second preferred embodiment of the present invention.
Figure 6:
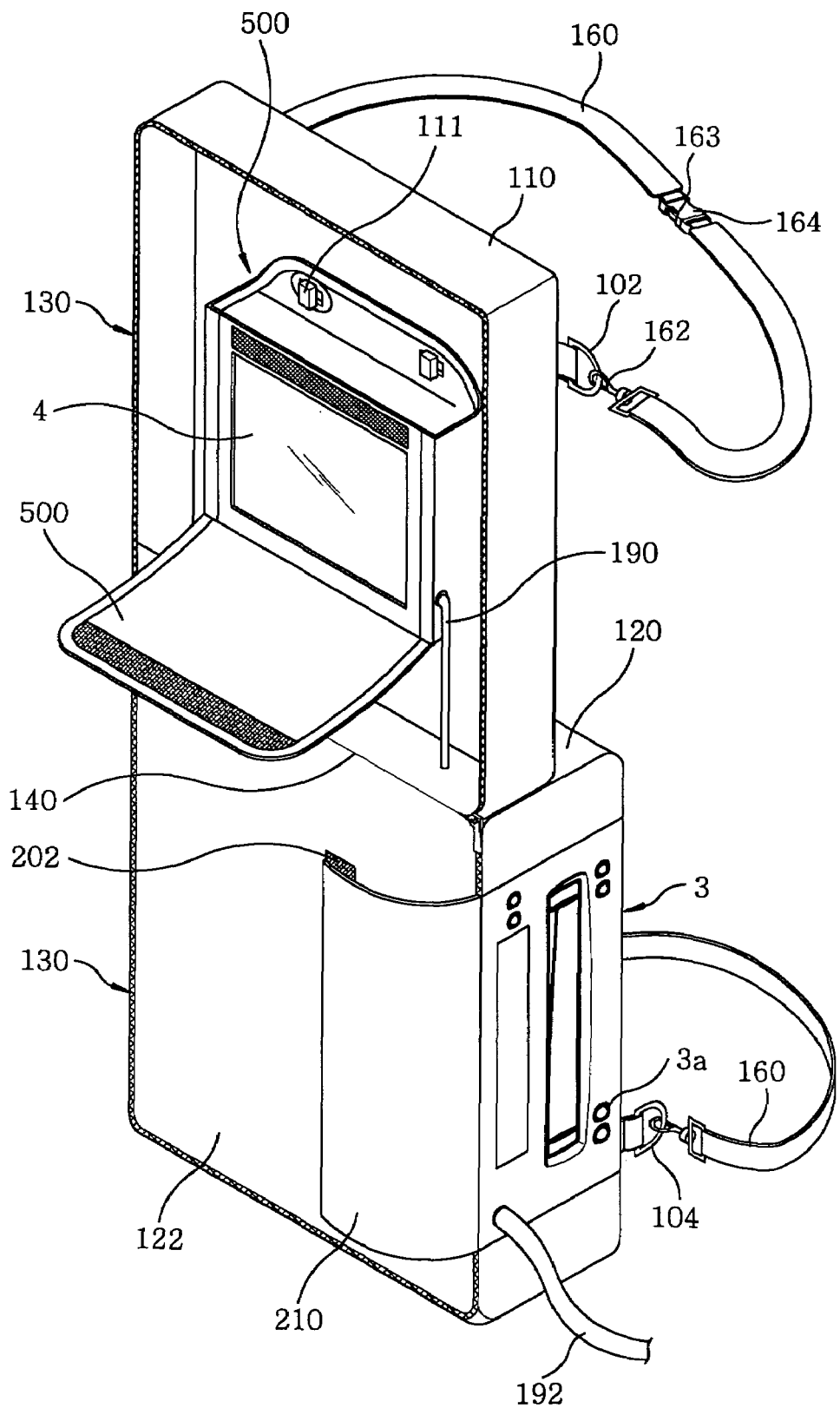
FIG. 6 depicts a perspective view of the case shown in FIG. 5 in an open mode.
Figure 7:
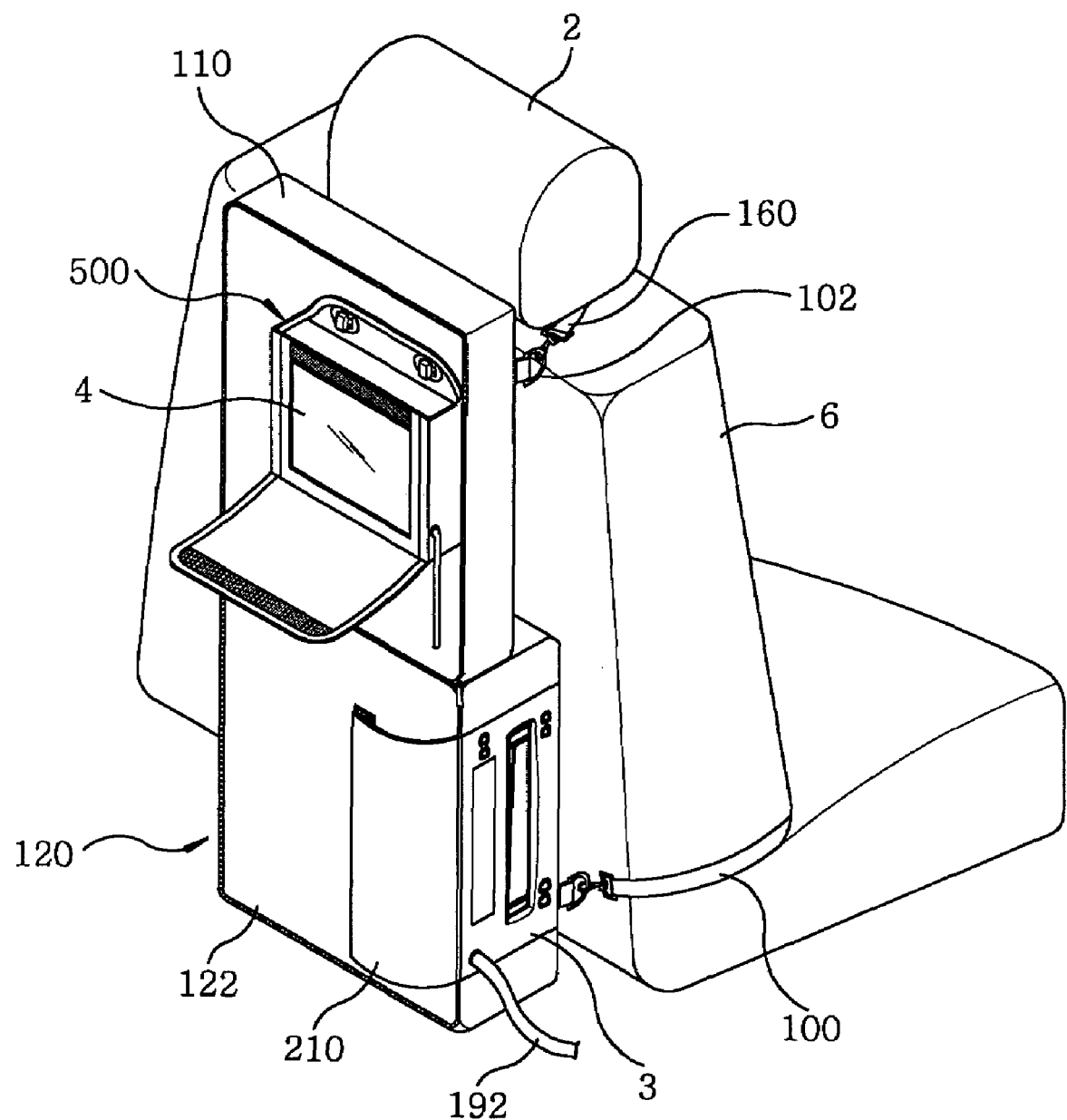
FIG. 7 provides a perspective view of the case shown in FIG. 5 in an operational mode, which is secured inside a car.

FIGS. 5 to 7 show a case 200 for carrying and mounting an image system in accordance with a second preferred embodiment of the present invention. As shown therein, the case 200 is identical to that of the first embodiment of the present invention, excepting that a rear case 120 has a different configuration from that of the first embodiment of the present invention. Thus, a description of the like parts in the first embodiment will be omitted for the simplicity of explanation, and instead the distinctive configuration of the rear case 120 will be focused and elaborated.

The rear case 120 is of a rectangular box shape in which a front side thereof is closed while a lateral side thereof is opened. An image reproducing device 3 is horizontally inserted and mounted into an inner space of the rear case 120 through the opened lateral side such that a manipulation panel 3a of the image reproducing device 3 is exposed through the opened lateral side. The image reproducing device 3 may be fixed by means of an elastic loop (not shown) in order to prevent the image reproducing device 3 from being separated from the rear case 120.

Further, provided at the opened lateral side of the rear case 120 is a cover 210 for covering or exposing the manipulation panel 3a of the image reproducing device 3.

The cover 210 is formed of the same material as used to form the rear case 120 and has one end integrally fixed to the rear case 120 and the other free end. The other free end of the cover 210 is fastened to a fastening tape (not shown) provided on the rear surface of the rear case 120, to thereby maintain an open mode of the case 200.

The case 200 configured as described above in accordance with the second embodiment of the present invention is secured to a seat 6 of a car by using mounting straps 160 connected to connection loops 102 and 104 provided at corner portions of a front case 110 and the rear case 120, respectively, as shown in FIG. 7.

Figure 8:
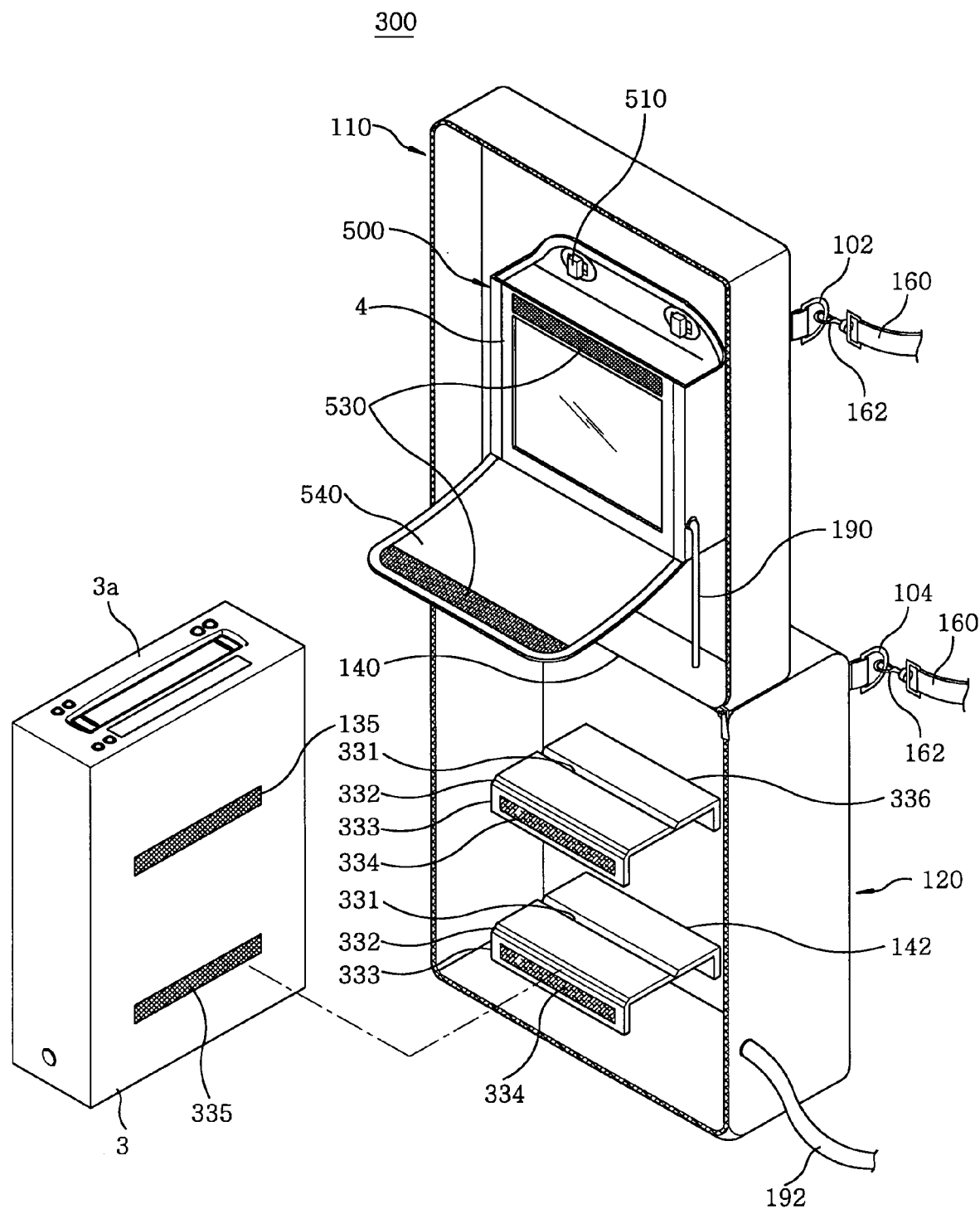
FIG. 8 is a perspective view of a case for carrying and mounting an image system in accordance with a third preferred embodiment of the present invention, which is in an open mode.
Figure 9A:
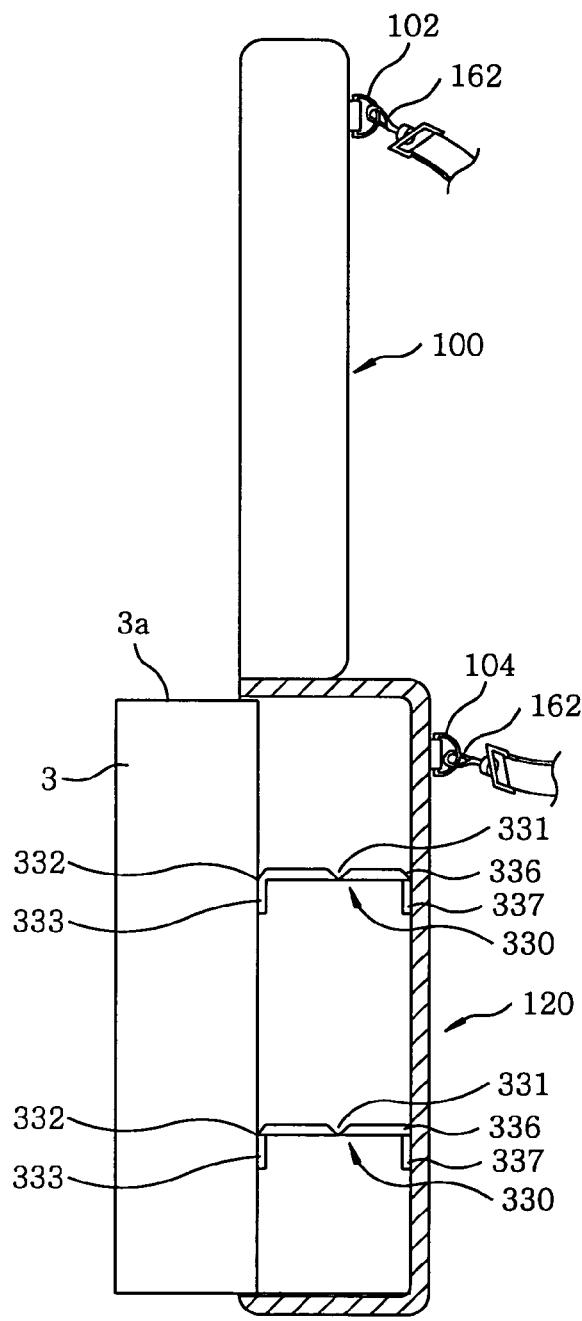
FIGS. 9A and 9B show the case of FIG. 8 from which an image reproducing device is taken out.
Figure 9B:
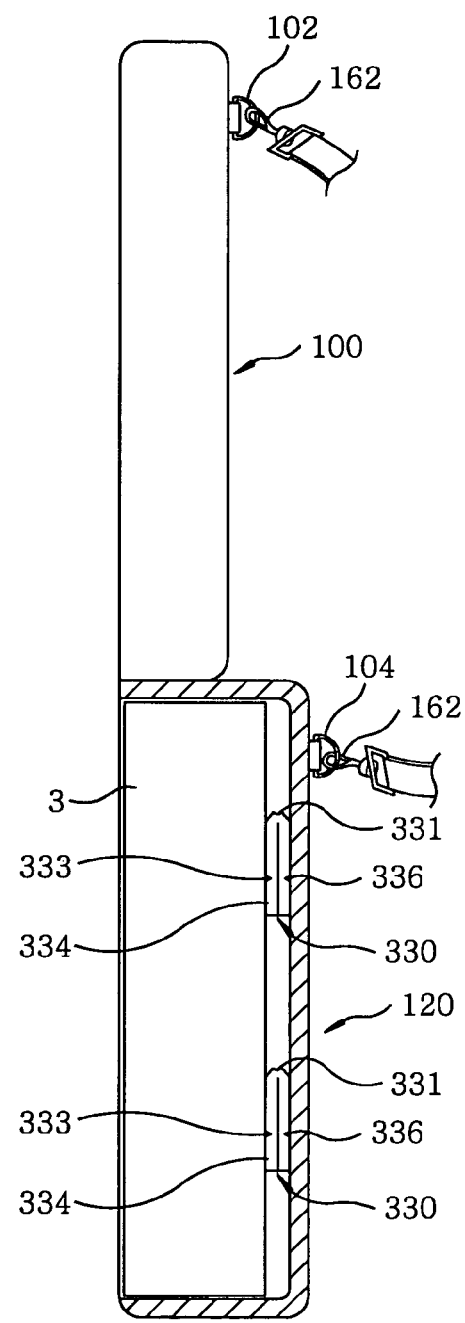
Figure 10:
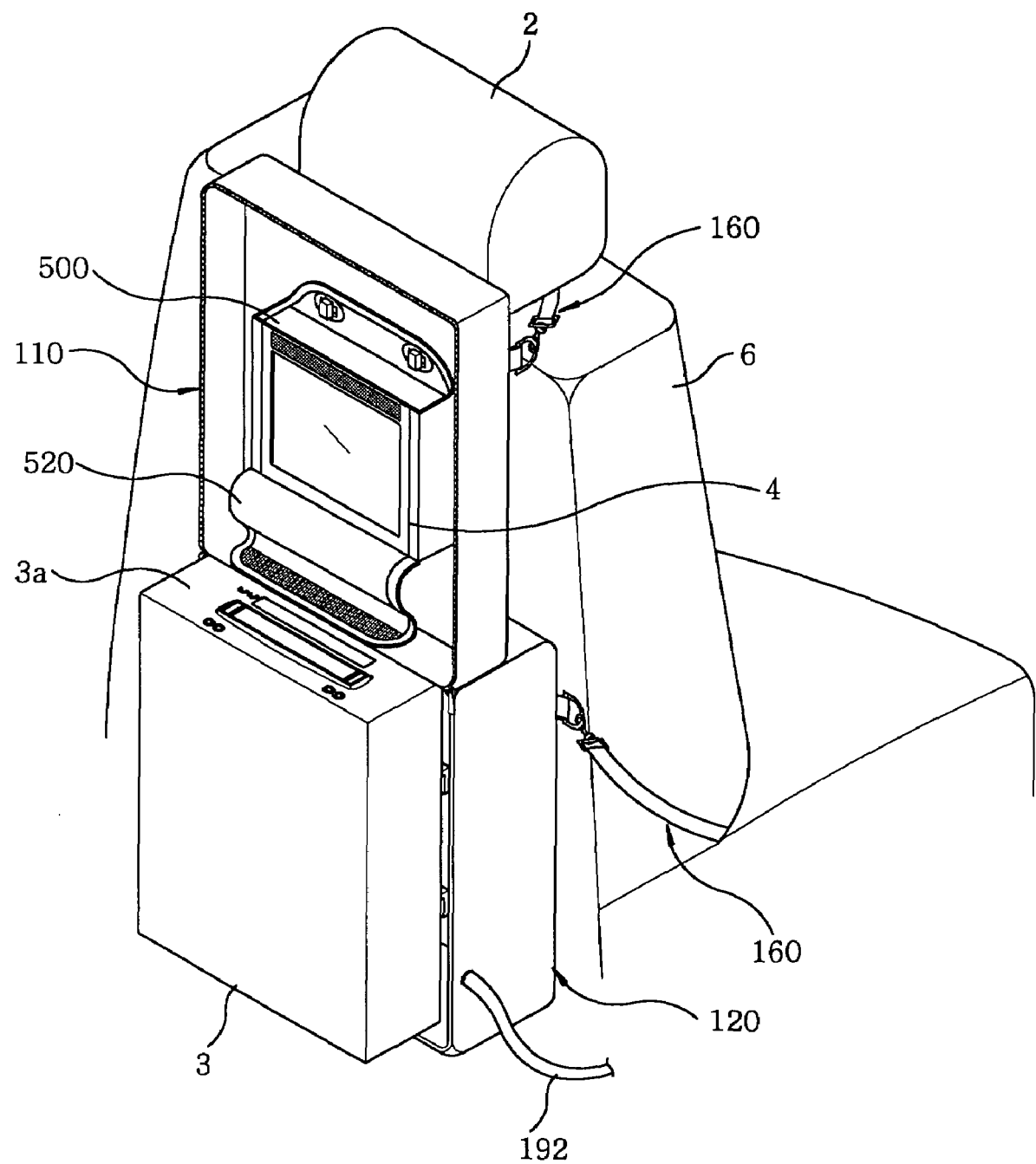
FIG. 10 offers a perspective view of the case shown in FIG. 8 in an operational mode, which is secured inside a car.

Referring to FIGS. 8 to 10, there is shown a case 300 for carrying and mounting an image system in accordance with a third preferred embodiment of the present invention. As shown therein, the case 300 in accordance with the third embodiment is identical to that of the first embodiment, excepting that take-out members 330 for taking out an image reproducing system 3 from a rear case 120 has a different configuration from the take-out member 130 of the first embodiment of the present invention. Thus, a description of the like parts in the first and the third embodiments will be omitted for the simplicity of explanation, and instead the distinctive configuration of the take-out member 330 will be focused and elaborated.

Two opposite ends of the take-out members 330 are coupled to the rear surface of the image reproducing device 3 and the inner surface of the rear case 120, respectively, such that the image reproducing device 3 is fixed at a position where a manipulation panel 3a thereof is exposed when the image reproducing device 3 is pulled forward out of the rear case 120. Each of the take-out members 330 is provided with a folding portion 331 at a central portion thereof, so that it can be folded in two, a folding plate 332 and a folding plate 336, about the folding portion 331.

At least one take-out member 330 is used, and the third embodiment employs two take-out members 330 respectively installed at upper and lower portions of the rear case 102. One end 337 with the folding plate 336 of each take-out member 330 is fixed to the inner surface of the rear case 120, while the other end 333 with the folding plate 332 is detachably secured to the rear surface of the image reproducing device 3 by fastening tapes 334 and 335.

The one end 337 of the take-out member 330 abutted to the inner surface of the rear case 120 is fastened thereto by sewing, and the other end 333 thereof is provided with the fastening tape 334 which is attached thereon by means of a double-faced tape or an adhesive or by sewing in order to be fastened to the fastening tape 335 which is provided on the rear surface of the image reproducing device 3 via a double-faced tape or an adhesive.

The take-out member 330 is unfolded when the image reproducing device 3 is drawn forward from the rear case 120, so that a part of a lower portion of the image reproducing device 3 is supported on the bottom portion of the rear case 120 and thus the image reproducing device 3 is fixed at the position where the manipulation panel 3a is exposed. When the image reproducing device 3 is pushed inside the rear case 120, on the other hand, the folding portion 331 and the folding plates 332 and 336 are folded in a certain direction, e.g., an upward direction as exemplified in FIG. 9B.

Figure 11A:
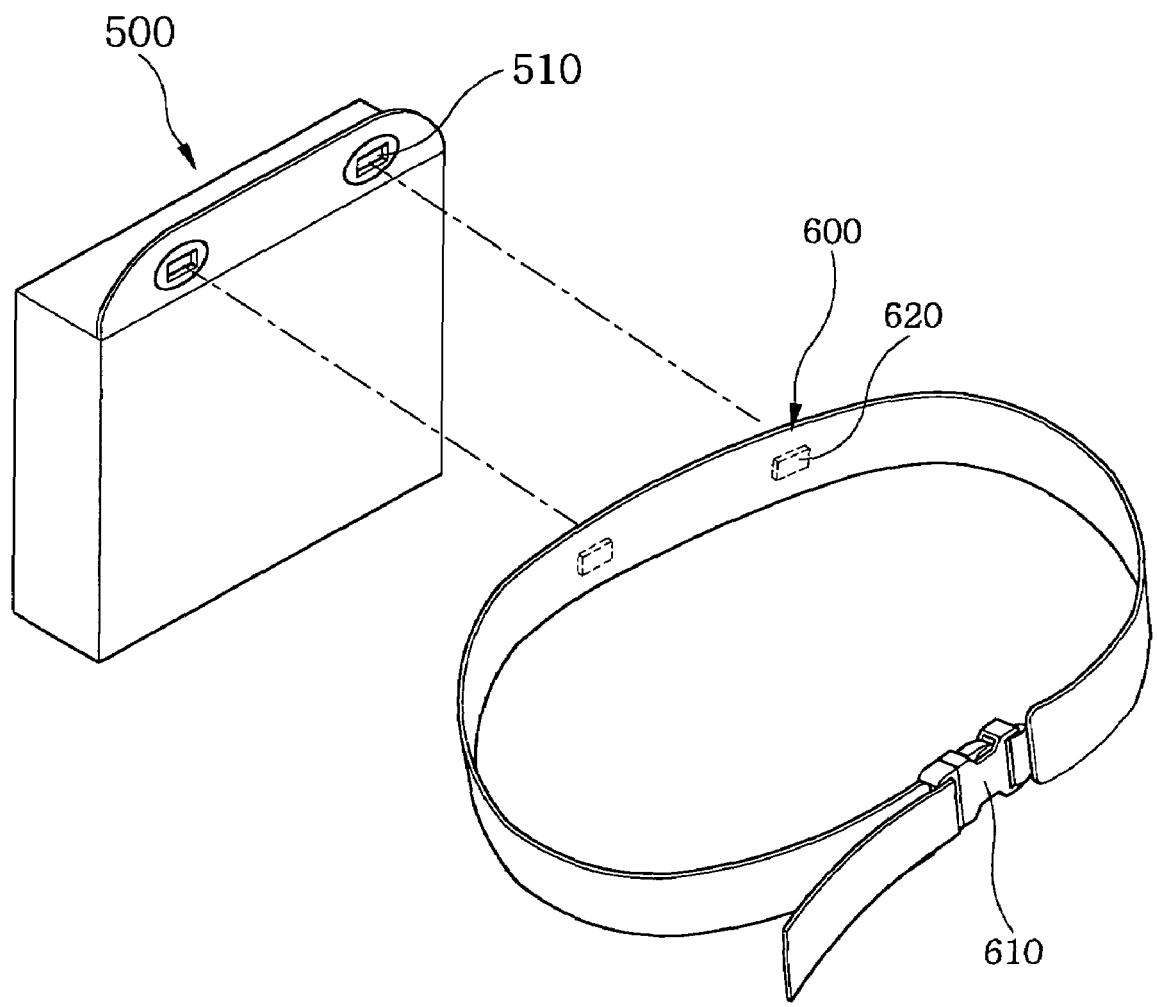
FIGS. 11A and 11B describe an example of mounting a display device by using only a mounting unit which is originally designed to be detachably secured to the inner surface the case shown in FIG. 2, 6 or 8.
Figure 11B:
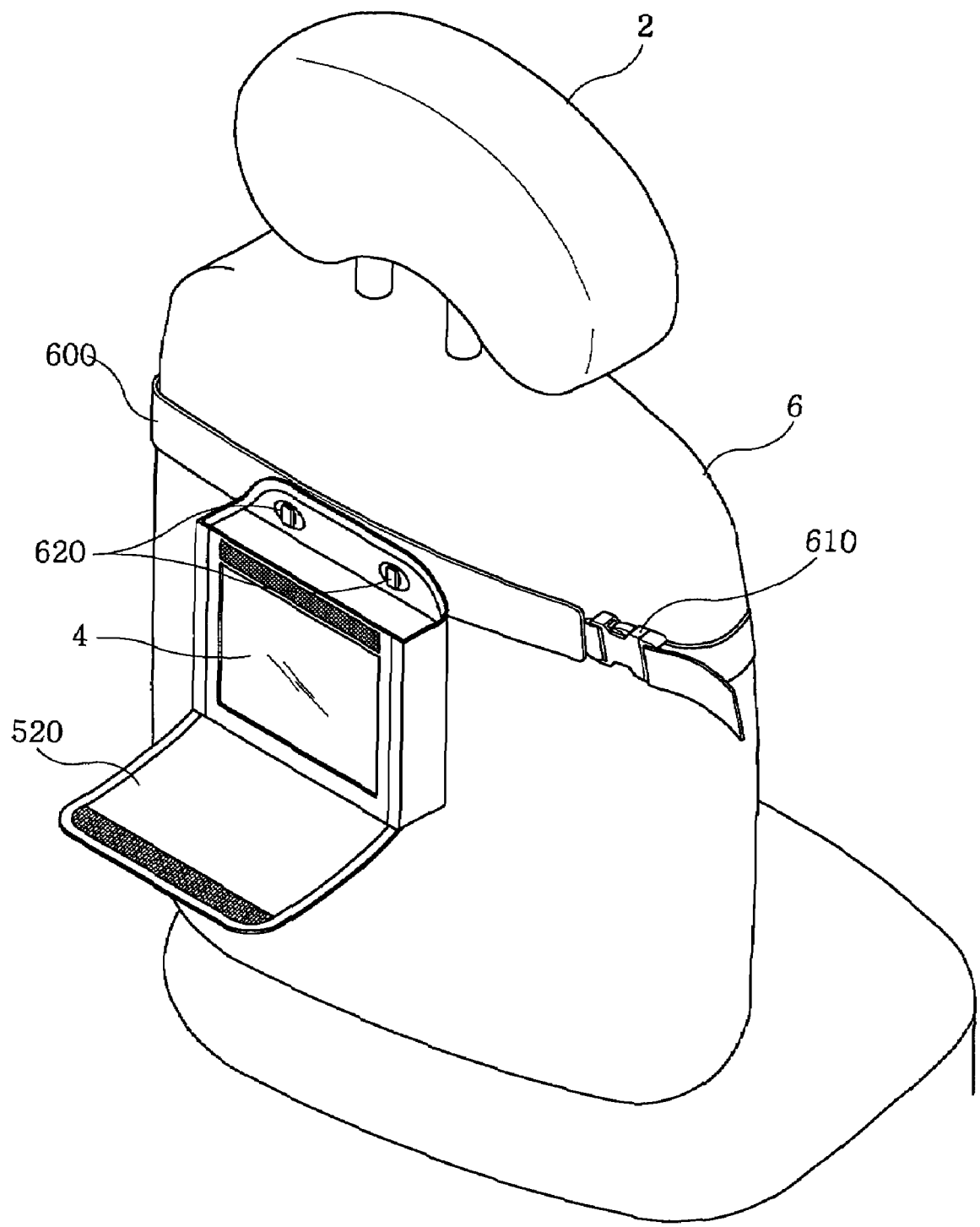

FIGS. 11A and 11B show an example of securing a mounting unit 500, which is designed to be detachably fastened to the inner surface of a front case 110, to a headrest 2 of a car directly by using a seat fastening strap 600. As shown in FIGS. 11A and 11B, the seat fastening strap 600 is detachably secured to the headrest 2 or a seat 6 of the car. The seat fastening strap 600 is provided with engagement protrusions 620 to be engaged with engagement holes 510 provided at an upper portion of the mounting unit 500 and has a length long enough to surround the seat 6 of the car. Further, since a length-adjusting clip 610 is installed at one end of the seat fastening strap 600, the seat fastening strap 600 can be fastened to the seat 6 firmly by adjusting the length thereof depending on the size of the seat 6 by way of tightening the clip 610.

Figure 12:
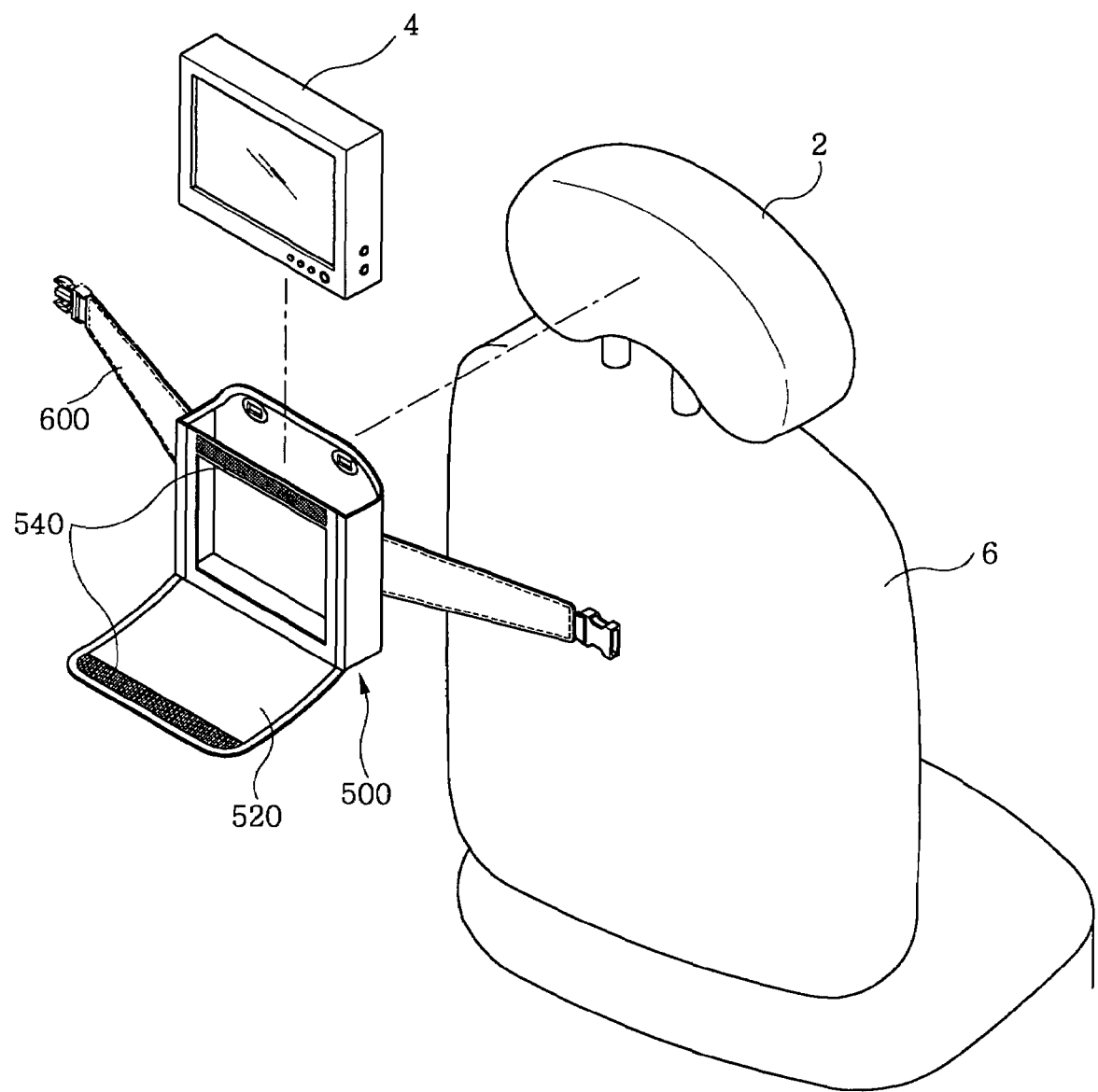
FIG. 12 is an exploded perspective view showing a modification of the mounting unit.

FIG. 12 shows a modification of the mounting unit 500 of FIGS. 11A and 11B, wherein seat fastening straps 600 are attached at two opposite sides of the mounting unit 500.

Figure 13A:
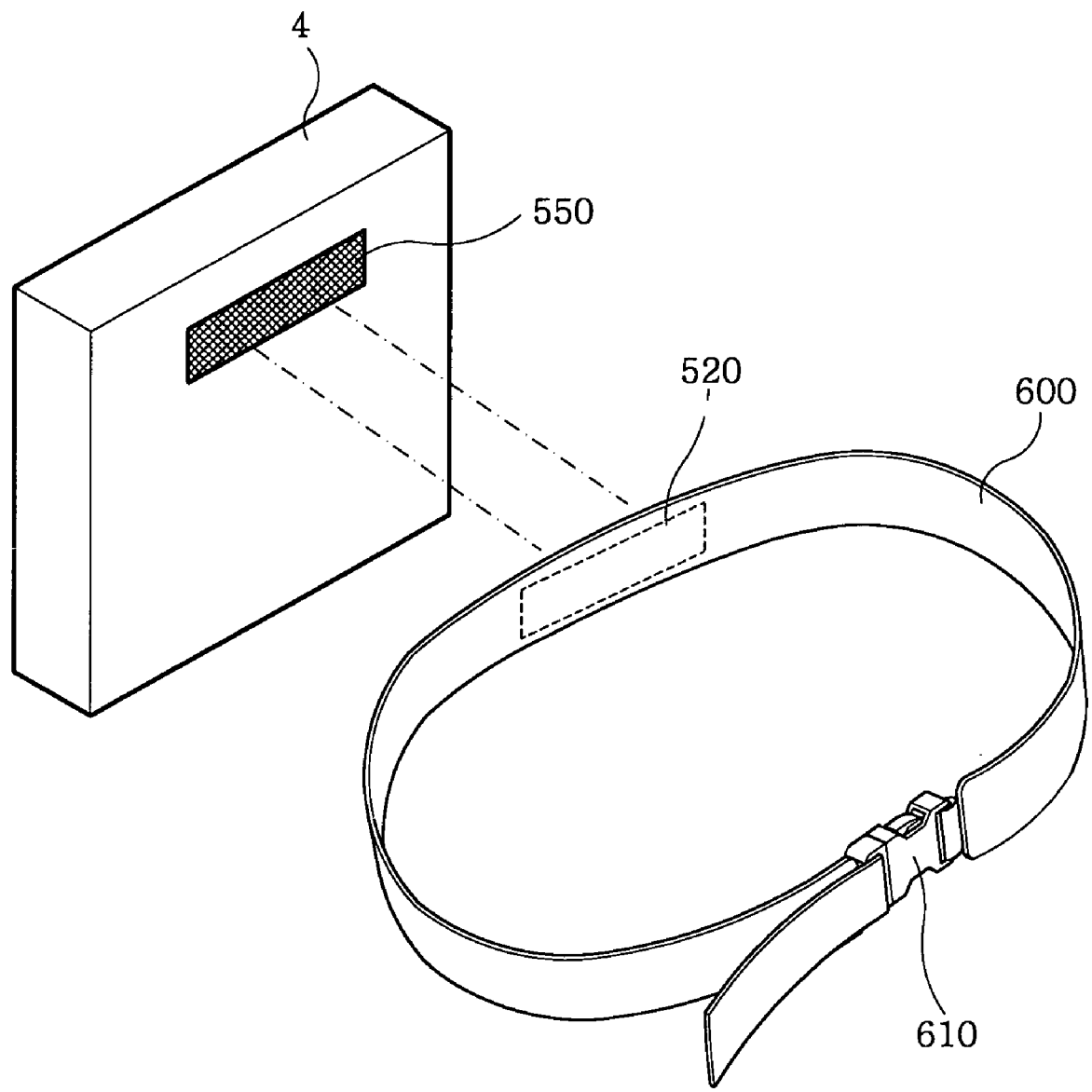
FIGS. 13A and 13B illustrate an example of mounting the display device without using the mounting unit.
Figure 13B:
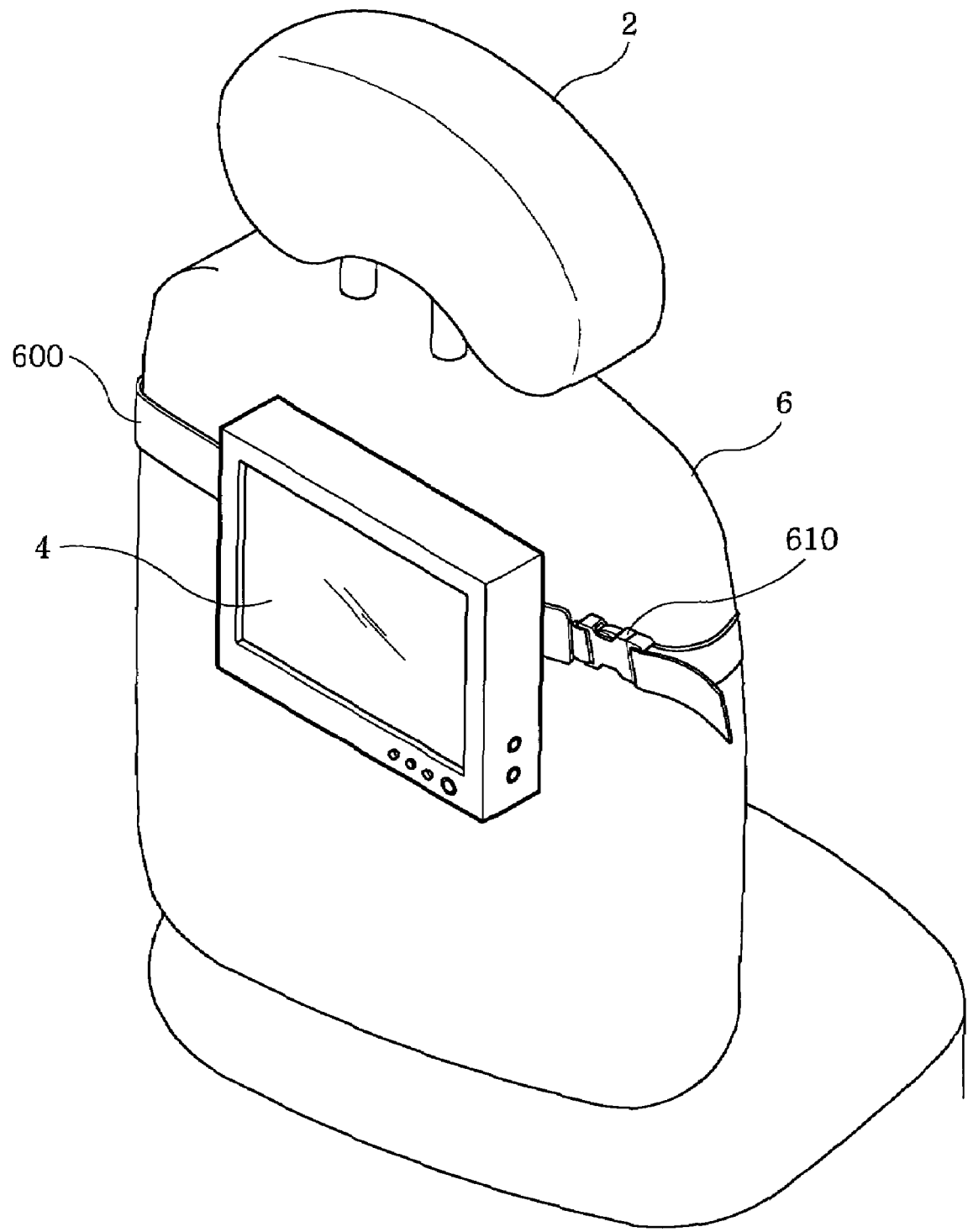
Figure 14A:
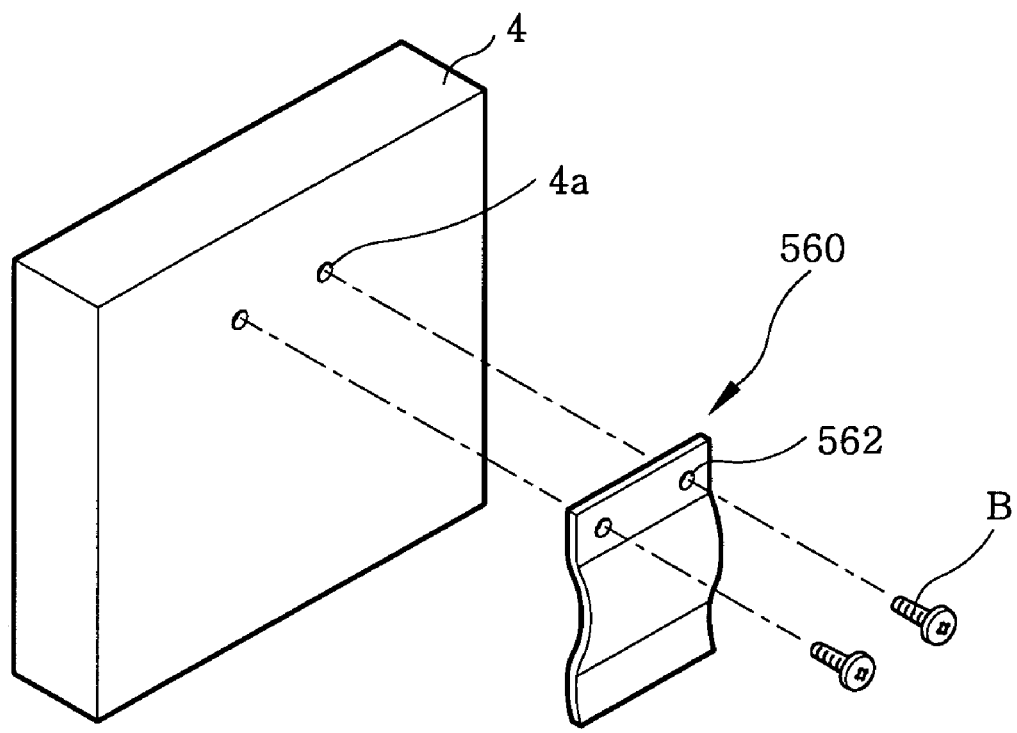
FIGS. 14A and 14B show a modification of FIG. 13.
Figure 14A:
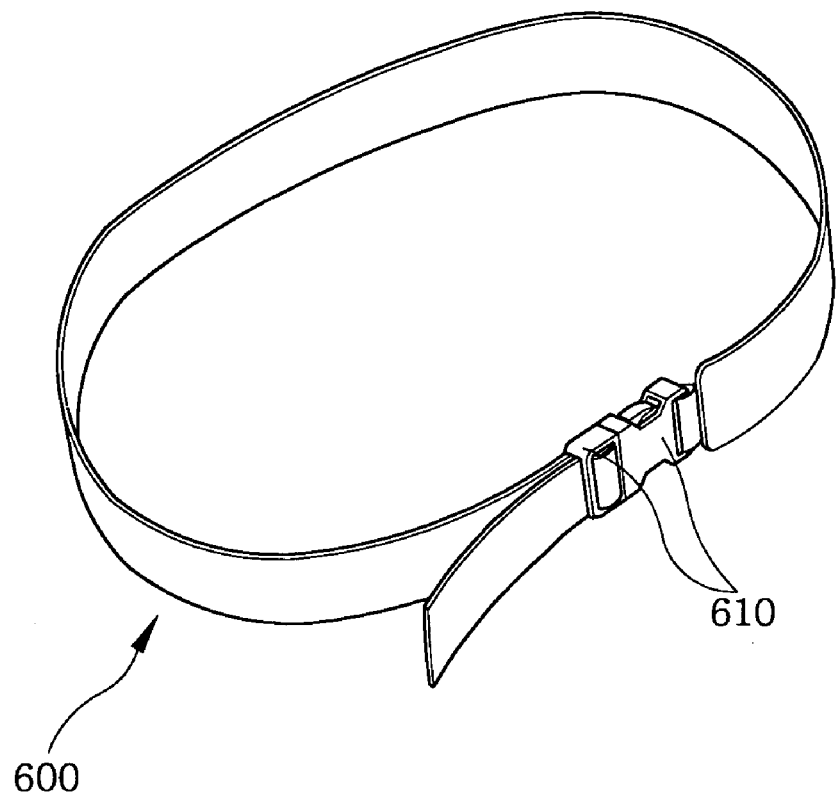
Figure 14B:
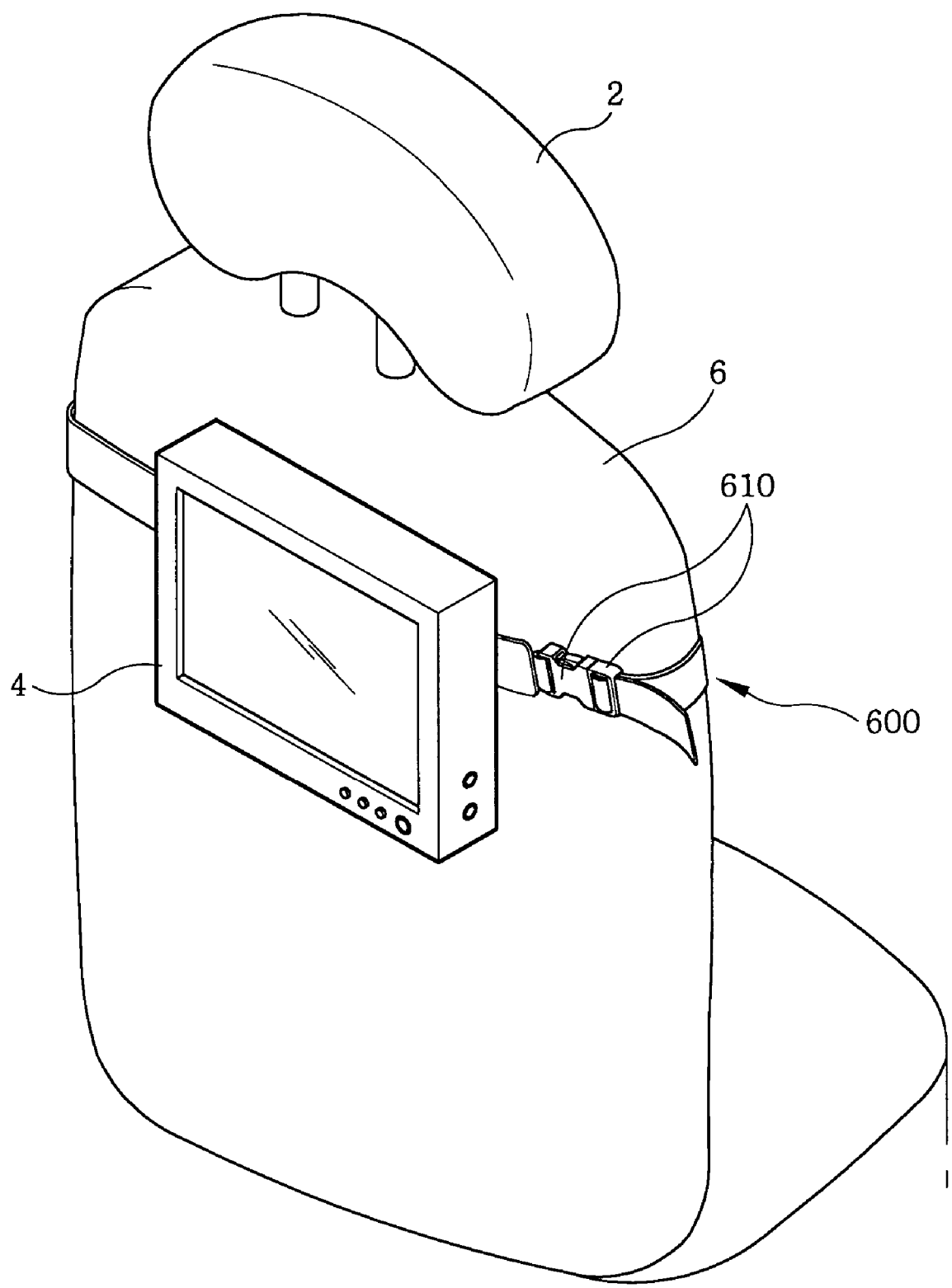
Figure 15:
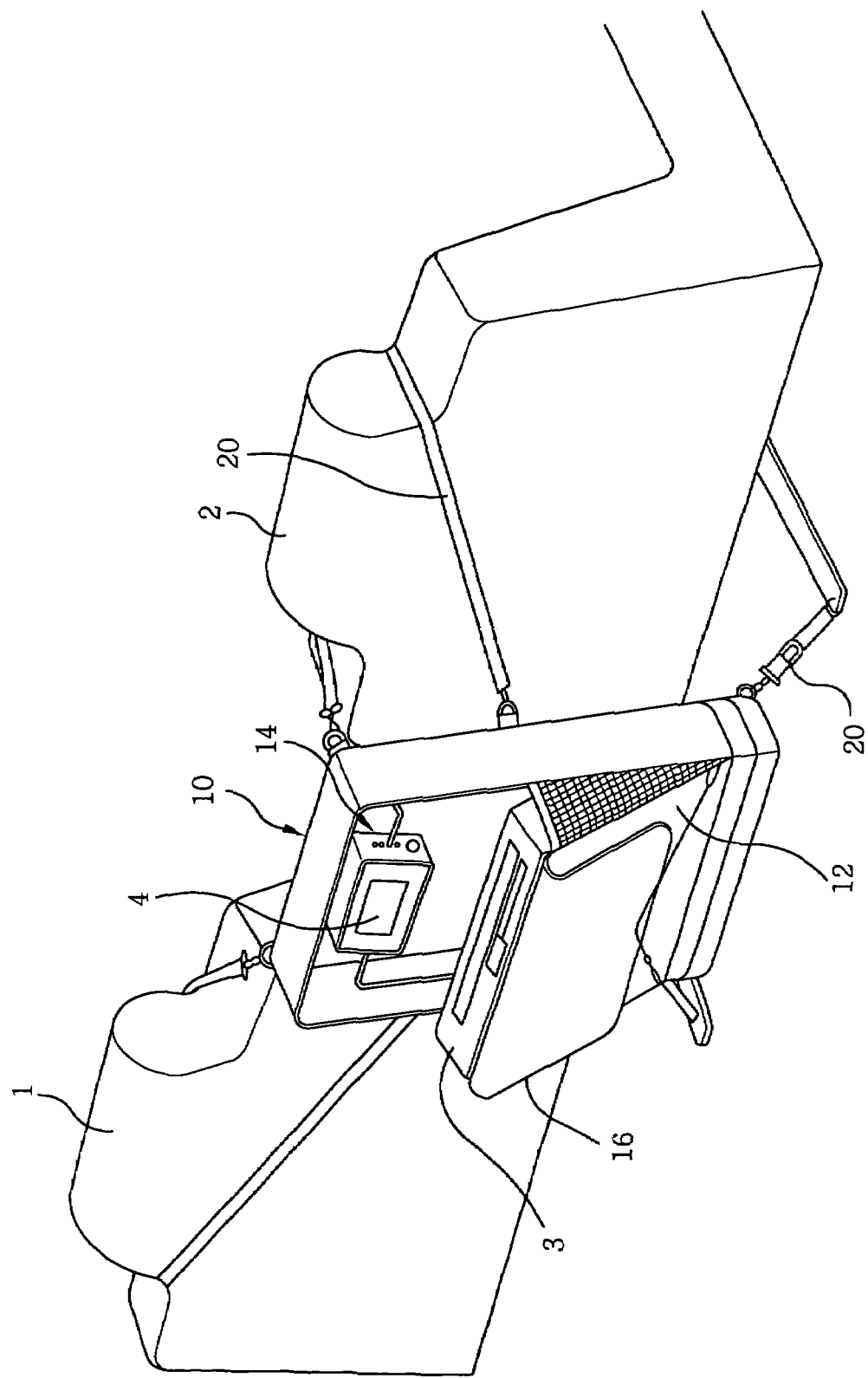
FIG. 15 is a perspective view of a prior art system case installed in a car.

Alternatively, FIGS. 13A to 14B illustrate examples showing how to secure a display device to a car without using a mounting unit. As shown in FIGS. 13A and 13B, a fastening tape 550 is attached to the rear surface of a display device 4 to be fastened to a fastening tape 550 correspondingly provided at a seat fastening strap 600, to thereby fix the display device 4 to the seat fastening strap 600. Referring to FIGS. 14A and 14B, a clip member 560 serving as a fastening unit is secured to the display device 4 by screwing bolts 564 through bolt holes 562 provided on the clip member 560 and bolt holes 566 provided on the rear surface of the display device 4. Then, by inserting the seat fastening strap 600 through the clip member 560, the display device 4 can be secured to the seat fastening strap 600.

In connection with FIGS. 11A to 14B, it is understood that it is possible to design the embodiments in FIGS. 12 to 14B to be associated with the front case 110 although the embodiments are depicted and described without having the front case 110. In this case, the seat fastening strap 600 may be secured to the mounting strap 160 shown in the first to third embodiments seat 6 through the front case 120 behind thereof.

As described above, a case for carrying and mounting an image system in accordance with the present invention is convenient to carry it and is capable of protecting an image system and parts therein while it is being carried. Furthermore, the case in accordance with the present invention is also advantageous in that it can be opened easily.

While the invention has been shown and described with respect to the preferred embodiments, it will be understood by those skilled in the art that various changes and modification may be made without departing from the spirit and scope of the invention as defined in the following claims.

What is claimed is:

1. A case for carrying and mounting an image system capable of accommodating an image reproducing device and a display device therein and of being secured to a seat of a car, comprising:

a first case for housing the display device;

a second case for housing the image reproducing device;

a connecting portion formed around one edge portions of the first and the second cases to allow anyone of the first and the second cases to be opened with respect to the other one by being rotated about the connecting portion;

a take-out member for taking out the image reproducing device mounted inside the second case to expose a manipulation panel of the image reproducing device; and mounting means for securing the first case and the second case around the seat of the car, wherein the take-out member includes:

a first and a second horizontal plate having one ends fixed on an inner surface of the second case such that they are rotable about the one ends, respectively;

a vertical plate for vertically connecting the other ends of the first and the second horizontal plate;

a supporting strap secured to an upper end of the vertical plate, for supporting the first and the second horizontal plate horizontally, when the first and the second horizontal plates are rotated to allow the image reproducing device to be taken out in a horizontal direction; and a fastening member installed at an external surface of the vertical plate for fastening the image reproducing device to the vertical plate.

2. The case of claim 1, further comprising a subsidiary case mounted in the second case for accommodating the image reproducing device, wherein the subsidiary case has a fastening member installed at an external surface thereof for connecting the subsidiary case to the fastening member of the vertical plate.

3. The case of claim 1, wherein the second case is of a box shape with an opened front side through which the image reproducing device is mounted in the second case.

4. The case of claim 1, wherein the second case is of a box shape with an opened lateral side through which the image reproducing device is inserted in the second case.

5. The case of claim 1, further comprising a combining member, installed around edge portions excepting the one edge portions of the first and the second cases, for integrally combining the first and the second cases to fold and fasten the first and the second cases.

6. The case of claim 5, wherein the combining member includes a zipper.

7. The case of claim 1, further comprising a handle formed over upper portions of the first and the second cases to carry the case.

8. The case of claim 1, further comprising a mounting unit detachably secured to the first case, for accommodating the display device therein.

9. The case of claim 8, wherein the mounting unit has a fastening member to be fastened to the mounting means secured around the seat of the car.

10. The case of claim 1, wherein the display device has a fastening member on a rear surface thereof, and wherein the fastening member of the display device is fastened to the mounting means secured around the seat of the car.

11. The case of claim 1, wherein the display device has a clip member on a rear surface thereof, and wherein the clip member is fastened to the mounting means secured around the seat of the car.

12. A case for carrying and mounting an image system capable of accommodating an image reproducing device and a display device therein and of being secured to a seat of a car, comprising:

a first case for housing the display device;

a second case for housing the image reproducing device;

a connecting portion formed around one edge portions of the first and the second cases to allow anyone of the first and the second cases to be opened with respect to the other one by being rotated about the connecting portion;

a take-out member for taking out the image reproducing device mounted inside the second case to expose a manipulation panel of the image reproducing device; and mounting means for securing the first case and the second case around the seat of the car, wherein the take-out member includes:

a first folding plate and a second folding plate being foldable about a folding portion at a central portion of the take-out member, wherein the first folding plate is fixed to the inner surface of the second case; and a fastening member installed at the second folding plate for detachably securing the image reproducing device to the second folding plate.

13. The case of claim 12, further comprising a subsidiary case mounted in the second case for accommodating the image reproducing device, wherein the subsidiary case has a fastening member installed at an external surface thereof for connecting the subsidiary to the fastening member of the second folding plate.

* * * * *